J. C. CLIME.
ROUNDABOUT.
No. 179,448. Patented July 4, 1876.
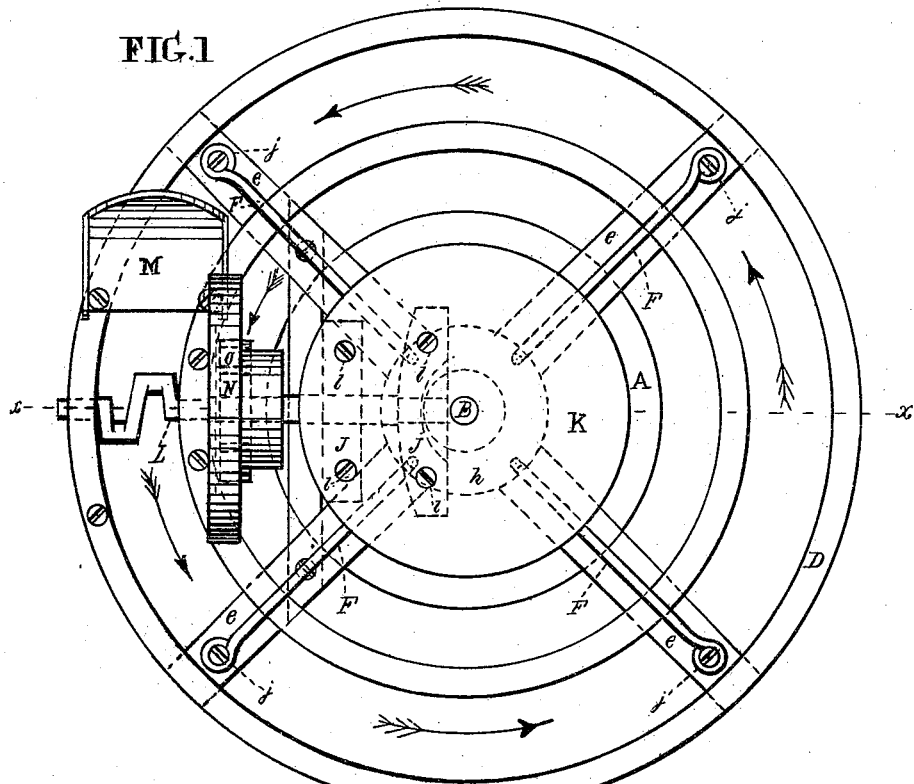
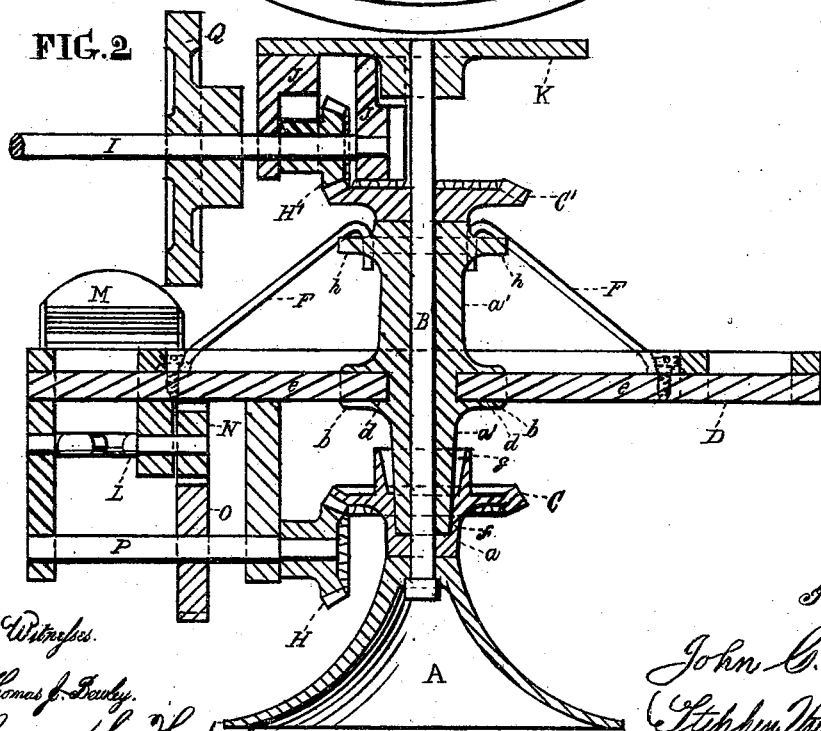
Witnesses.
Thomas J. Dowly.
George C. Hetzel.
Inventor
John C. Clime
Stephen Ustick Attorney.
N. PETERS, PHOTO-LITHOGRAPHER, WASHINGTON, D. C.

UNITED STATES PATENT OFFICE.

JOHN C. CLIME, OF PHILADELPHIA, PENNSYLVANIA, ASSIGNOR OF ONE-HALF HIS RIGHT TO PIERSON S. CLIME, OF SAME PLACE.

IMPROVEMENT IN ROUNDABOUTS.

Specification forming part of Letters Patent No. 179,418, dated July 4, 1876; application filed December 6, 1875.

*To all whom it may concern:*

Be it known that I, JOHN C. CLIME, of the city and county of Philadelphia, in the State of Pennsylvania, have invented a new and useful Improvement in Roundabouts, which is fully set forth in the following specification, reference being had to the accompanying drawings.

My invention consists in the combination of a rotating wheel, which is provided with a crank shaft and seat for the operator, with a vertical stationary shaft, on which the wheel rotates, and with a revolving driving-shaft, by means of a series of gear wheels, as hereinafter fully described.

In the accompanying drawings, Figure 1 is a plan view of the machine. Fig. 2 is a vertical section at the line $x\ x$ of Fig. 1.

Like letters of reference in both figures indicate the same parts.

A is the base of the machine, which should be firmly secured to the floor or other suitable foundation. B is a central vertical shaft, the lower end of which is fast in the base A. C is a bevel-gear wheel, fast on the shaft B, having its hub $a$ resting on the upper and central part of the base. D is a horizontal wheel, having a central hub, $a'$, with an enlargement, $b$, having mortises $d$, with which are connected the inner ends of the radial arms $e$ of the wheel. The lower end of the hub fits in the central recess $f$ of the bevel-gear wheel C, in which it turns. The upper side of the hub of the latter has an annular oil-cup, $g$, from which the oil passes to the step $f$ to keep it continually well lubricated. There are stay-rods or braces F, the upper ends of which are hooked into holes in the flange $h$ on the upper end of the hub $a'$. The lower ends of the rods have eyes $j$, through which screws pass into the spokes or arms $e$ of the wheel. Instead of casting the hub $a'$ in a single piece, as shown in Fig. 2, the upper end having the flange $h$ may be cast separate from the lower part, as a matter of convenience, if desired.

Permanently connected with the upper end of the hub $a'$ is the bevel-wheel $C'$, which gears into the pinion H' on the inner end of the driving-shaft I, which has bearings in the hangers J J, that are firmly secured, by means of screws $l$, to the lower side of the stationary cap-plate K, on the upper end of the stationary shaft B. The object of the said driving-shaft I is the transmission of power to such machinery as may be advantageously propelled by my improved roundabout.

L is a double crank-shaft, which serves for a treadle for a person sitting on the seat M. On the inner end of said shaft is a spur-pinion, N, which gears into the wheel O on the horizontal shaft P, and on the inner end of said shaft P is a bevel-pinion, H, which gears into the stationary bevel-wheel C, above described.

The operation of the machine is as follows: Motion is given to the crank-shaft L by a person seated on the seat M of the wheel D, thereby revolving the shaft P by means of the pinion N and wheel O on the two shafts, and the bevel-pinion H on the said shaft P being carried around the stationary bevel-wheel C, into which it gears by the revolution of the shaft P, the horizontal wheel D is rotated, and the bevel-wheel C', on the upper end of the hub $a'$, by gearing into the bevel-pinion H' on the driving-shaft I, as above described, gives motion to said shaft for transmitting power, by means of the belt-wheel Q, or other device, as may be desired.

I claim as my invention—

The combination, in a roundabout, of the rotating wheel D, having a crank-shaft, L, and seat M, with the stationary shaft B and driving-shaft I, the several parts being constructed and arranged and geared together, substantially in the manner and for the purpose set forth.

JOHN C. CLIME.

Witnesses:
STEPHEN USTICK,
THOMAS J. BEWLEY.